(12) United States Patent
Hobbs et al.

(10) Patent No.: US 8,028,040 B1
(45) Date of Patent: Sep. 27, 2011

(54) METHOD AND APPARATUS FOR COMMUNICATIONS BETWEEN A VIRTUALIZED HOST AND REMOTE DEVICES

(75) Inventors: David Victor Hobbs, Surrey (CA); Ian Cameron Main, Vancouver (CA)

(73) Assignee: Teradici Corporation (CA)

( * ) Notice: Subject to any disclaimer, the term of this patent is extended or adjusted under 35 U.S.C. 154(b) by 990 days.

(21) Appl. No.: 11/613,981

(22) Filed: Dec. 20, 2006

Related U.S. Application Data

(60) Provisional application No. 60/752,760, filed on Dec. 20, 2005.

(51) Int. Cl.
*G06F 15/16* (2006.01)
(52) U.S. Cl. ........ 709/219; 709/245; 709/220; 709/250; 710/52; 710/240; 710/305; 710/63; 710/313; 370/392; 370/389; 718/1
(58) Field of Classification Search .......... 709/245, 709/219, 220, 250; 710/52, 240, 305, 63, 710/313; 370/392, 389; 718/1
See application file for complete search history.

(56) References Cited

U.S. PATENT DOCUMENTS

| | | | |
|---|---|---|---|
| 5,883,670 A * | 3/1999 | Sporer et al. | 375/240.25 |
| 6,205,479 B1 * | 3/2001 | Dulai et al. | 709/225 |
| 6,470,436 B1 * | 10/2002 | Croft et al. | 711/206 |
| 6,583,887 B1 * | 6/2003 | Clouthier et al. | 358/1.15 |
| 6,708,247 B1 * | 3/2004 | Barret et al. | 710/313 |
| 7,908,335 B1 | 3/2011 | Citterelle et al. | |
| 2002/0143842 A1 * | 10/2002 | Cota-Robles et al. | 709/1 |
| 2005/0240685 A1 * | 10/2005 | Keys | 710/8 |
| 2006/0069458 A1 * | 3/2006 | Lee et al. | 700/94 |
| 2006/0089992 A1 * | 4/2006 | Blaho | 709/227 |
| 2007/0209035 A1 * | 9/2007 | Sonderegger et al. | 718/1 |
| 2008/0037656 A1 * | 2/2008 | Hannuksela | 375/240.26 |

OTHER PUBLICATIONS

USB/IP—a Peripheral Bus Extension for Device Sharing over IP Network by Hirofuchi et al, 2005.*
Nieh, Jason et al., "A Comparison of Thin-Client Computing Architectures", Technical Report CUCS-022-00, Nov. 2000, Network Computing Laboratory, Columbia University, United States of America.
Co-pending U.S. Appl. No. 11/278,378 entitled Methods and Apparatus for Bridging a USB Connection filed Mar. 31, 2006.
"The Business of N Port Virtualization", Whitepaper Document No. 06-147, Sep. 2005, 4 pages, Emulex Corporation, Costa Mesa, CA, USA.

* cited by examiner

*Primary Examiner* — Wing Chan
*Assistant Examiner* — Hitesh Patel
(74) *Attorney, Agent, or Firm* — Lewis and Roca LLP

(57) ABSTRACT

Communicating between virtual machines on a host computer and remotely located devices connected to device interfaces of remote computers is disclosed. The method comprises establishing communication between the host computer and at least one remote computer in operative control of at least a first device interface and a second device interface; determining that the device interfaces belong to a set of supported device interfaces; associating the at least one remote computer with at least one virtual machine; presenting to the virtual machine, in forms recognizable by the virtual machine as forms in which interface functions are presented by local controllers, interface functions associated with the first device interface and the second device interface; executing commands in response to the interface functions associated with the device interfaces; and sending to the remote computer commands and/or data related to the presented interface and usable by the device interfaces.

19 Claims, 8 Drawing Sheets

METHOD AND APPARATUS FOR COMMUNICATIONS BETWEEN A VIRTUALIZED HOST AND REMOTE DEVICES

RELATED APPLICATION

This application claims priority to U.S. provisional patent application Ser. No. 60/752,760, filed Dec. 20, 2005, incorporated by reference herein in its entirety.

FIELD

The present invention relates generally to computer peripheral device interfaces. More specifically, the present invention relates to bridging peripheral device interfaces across a shared network between remote computers and a host computer system running virtualization software.

BACKGROUND

Historic advances in computer technology have made it economical for individual users to have their own computing system, which caused the proliferation of the personal computer (PC). Continued advances of this computer technology have made these personal computers very powerful but also complex and difficult to manage. For this and other reasons such as corporate security, there is a desire in many workplace environments to separate user interface devices, including the display, keyboard, mouse, audio and other peripheral devices from the storage and application processing parts of the computing system. In this configuration, the user interface devices are physically located at the desktop, while the processing and storage components of the computer are placed in a central location. The user interface devices are then connected to the processing and storage components, herein referred to as the "host computer system" with some method of communication.

It has also become popular for centralized computing systems to use software virtualization technologies such as Xen, VMWare™ or others that enable a host computer system to simultaneously host multiple isolated user environments, each with its own application software, operating system, memory resources and network connection. In the case of both 1:1 systems (where 1:1 describes systems with a single remote computer with user-interface connected to a single host computer system) and N:1 systems (N user interfaces connected to a single host computer system), there is a need for efficient methods to bridge the various user interface devices such as display, audio, USB, Firewire™ or other peripherals between the host computer system and remote user interface systems.

Existing methods for enabling communications between remote peripheral devices and a virtualized host computer environment use software driver bridging protocols within a virtual machine framework such as GDI from VMware. Products incorporating software driver bridging protocols include ICA from Citrix Systems, Remote Desktop Protocol (RDP) from Microsoft Corporation, VNC or others. These methods require complementary client bridging software and drivers at the remote computer to complete the software bridging function. A problem with N:1 systems using bridged drivers is that the remote computer is burdened with maintainable software which in turn increases processing requirements and adds to computer support costs.

Network interfaces and network storage products such as virtualized fibre channel host bus adapters with N_Port ID virtualization provide a bridge between multiple virtual machines and remote systems. Specifically, the N_Port ID extension to the fibre channel specification allows multiple virtual machines to share a physical port of a single fibre channel host bus adapter (HBA). These virtualized N_Port IDs allow a physical fibre channel port to appear as multiple, distinct ports, providing separate port identification and security zoning within the fabric for each operating system image. The I/O transactions of each virtual machine are separately identified, managed, and transmitted, and are processed the same as if each operating system image had its own unique physical port.

Existing bridging methods such as N_Port ID virtualization are unsuited to enabling devices with compound compatibility requirements to be associated with a virtual machine. They lack the synchronization capabilities and data transfer structures necessary for the communication of a diversity of time critical signals between a remote user interface and a virtual machine in a host computer system. In summary, existing methods for bridging remote devices either use software bridging techniques with significant complexity at the remote user interface or other bridging methods limited to enabling the virtualization of sub-systems such as networked storage arrays with monolithic interface requirements. Therefore, a better method for enabling communications between a virtualized host computer system and remote user interface devices that meets the technical and economic objectives of centralized host computing is needed.

SUMMARY

The present invention provides methods and apparatus for establishing connections between a virtualized host computer system and device interfaces associated with multiple remote computers. Communication is established with each remote computer and remote device interfaces are associated with corresponding interface functions at a host computer system. The system uses native device and bus drivers within each virtual machine and no software drivers are required at the remote computers. In one aspect of the present invention, a set of device interfaces associated with a remote computer is presented to a virtual machine as a set of interface functions compatible with native bus and device drivers. Unlike software bridging methods, no bus or device driver software is required at the remote computer.

In another aspect of the present invention, different interface functions are presented corresponding to the different types of device interfaces. Audio, USB and display embodiments are presented. Unlike existing driver-agnostic bridging methods, the described interface functions and associated transfer management methods enables connection of audio, USB, video and other user interface signal between a remote computer and a virtual machine perceptually indistinguishable from locally terminated connections.

In another aspect of the present invention, methods for establishing and maintaining communications between a virtual machine and device interfaces are provided. A connection manager maps a set of interface functions to a virtual machines based on capabilities, user profiles, priorities or resource loading is presented. Once a connection is terminated, resources are freed for allocation to other connections. Connection management methods are transparent to device interfaces at the remote computer and software drivers in the virtual machine environment.

In summary, the present invention provides apparatus and efficient methods for bridging of device interfaces between remote computers and a virtualized host computer system.

Many other features and advantages of the present invention will become apparent from reading the following detailed description, when considered in conjunction with the accompanying drawings, in which:

DETAILED DESCRIPTION

In the following detailed description of the present invention, methods and apparatus for establishing connections between a virtualized host computer system and device interfaces, numerous specific details are set forth to provide a more thorough description of embodiments of the invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
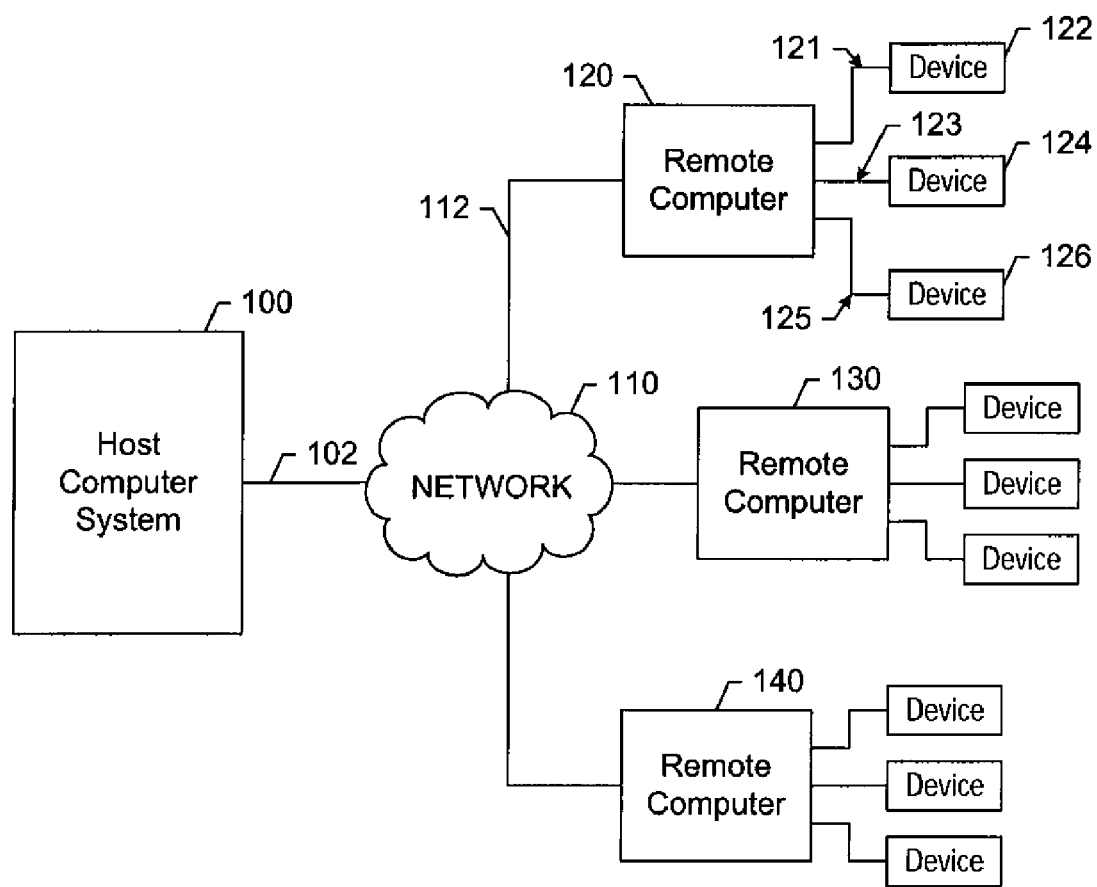
FIG. 1 is a diagram of a system comprising a host computer system connected across a network to remote computers with peripheral devices.

FIG. 1 shows an embodiment of a system that provides communications between a host computer system and multiple remote computers at different locations on a network. In the described system, each remote computer is also connected to a set of peripheral devices by a set of device interfaces. Referring to FIG. 1, host computer system 100 is connected by network connection 102 to network 110. An embodiment of system 100 is described in FIG. 2 and an alternative embodiment presented in FIG. 11. Network 110 is a reliable network such as an IP-based local area network (LAN) used in a corporate environment or a wide area network (WAN), as might be deployed between an application service provider such as an Internet service provider (ISP) and a set of residential application users.

Remote computer 120 is connected to network 110 by network connection 112. In one embodiment, connection 112 is an IP over Ethernet connection. Wireless, cable, digital subscriber line (DSL) or embodiments using other transport layer technologies are all suitable alternatives. Remote computer 120 provides a computer interface with graphic user interface (GUI) functions for a remote user and is further described herein and illustrated in FIG. 7.

Peripheral device 122 is connected to remote computer 120 by device interface 121. Interface 121 is a computer peripheral interface such display, mouse or keyboard interface using one or more different physical peripheral bus interfaces such as video graphics array (VGA), universal serial bus (USB), Firewire™, PS/2, RS-232, IEEE-1284 parallel port or other peripheral computer interface. A display interface is an example of an interface using multiple physical peripheral bus connections. In one embodiment, a display interface comprises both a digital visual interface (DVI) image bus and an I2C bus transporting display data channel (DDC) control information. A USB interface is another example of an interface using multiple physical peripheral bus connections. A USB interface may be comprised of multiple physical ports emanating from a common USB hub. A PCI interface is yet another example of an interface using multiple physical peripheral bus connections. A PCI interface may be comprised of multiple physical PCI connections emanating from a common PCI bridge.

Device 122 is a remotely located peripheral device compatible with interface 121. Examples of device 122 include a computer display, mouse, keyboard, printer, headphones, speakers, webcam or other peripheral such as other USB or Firewire peripheral devices.

Remote computer 120 is also connected to device 124 using device interface 123 and to device 126 using device interface 125. In an embodiment, interfaces 123 and 125 are of the same type as interface 121. In an alternative embodiment, they are different interface types. In an embodiment, interfaces 121, 123 and 125 are managed as independent device interfaces. In an alternative embodiment, they are managed as a single device interface.

Similarly, in an embodiment, devices 124 and 126 are of the same type as device 122. In an alternative embodiment, they are different device types. It is to be understood that this detailed description differentiates between different device types according to their device interface. Devices using different device interface types are of different device types and devices using the same type of device interface are the same device type). While the embodiment shown in FIG. 1 has three devices connected to computer 120, alternative embodiments have different numbers of devices.

Remote computers 130 and 140 are also connected to network 110. Each of these computers also has a set of devices typical of a computer user interface. In an embodiment, these are similar device types to the devices described for computer 120. In an alternative embodiment, these are different device types. While the embodiment in FIG. 1 shows three devices connected to each of computers 130 and 140, alternative embodiments have different numbers of devices connected to each remote computer. Moreover, while the embodiment in FIG. 1 shows three remote computers connected to network 110, alternative embodiments have different numbers of remote computers.

Figure 2:
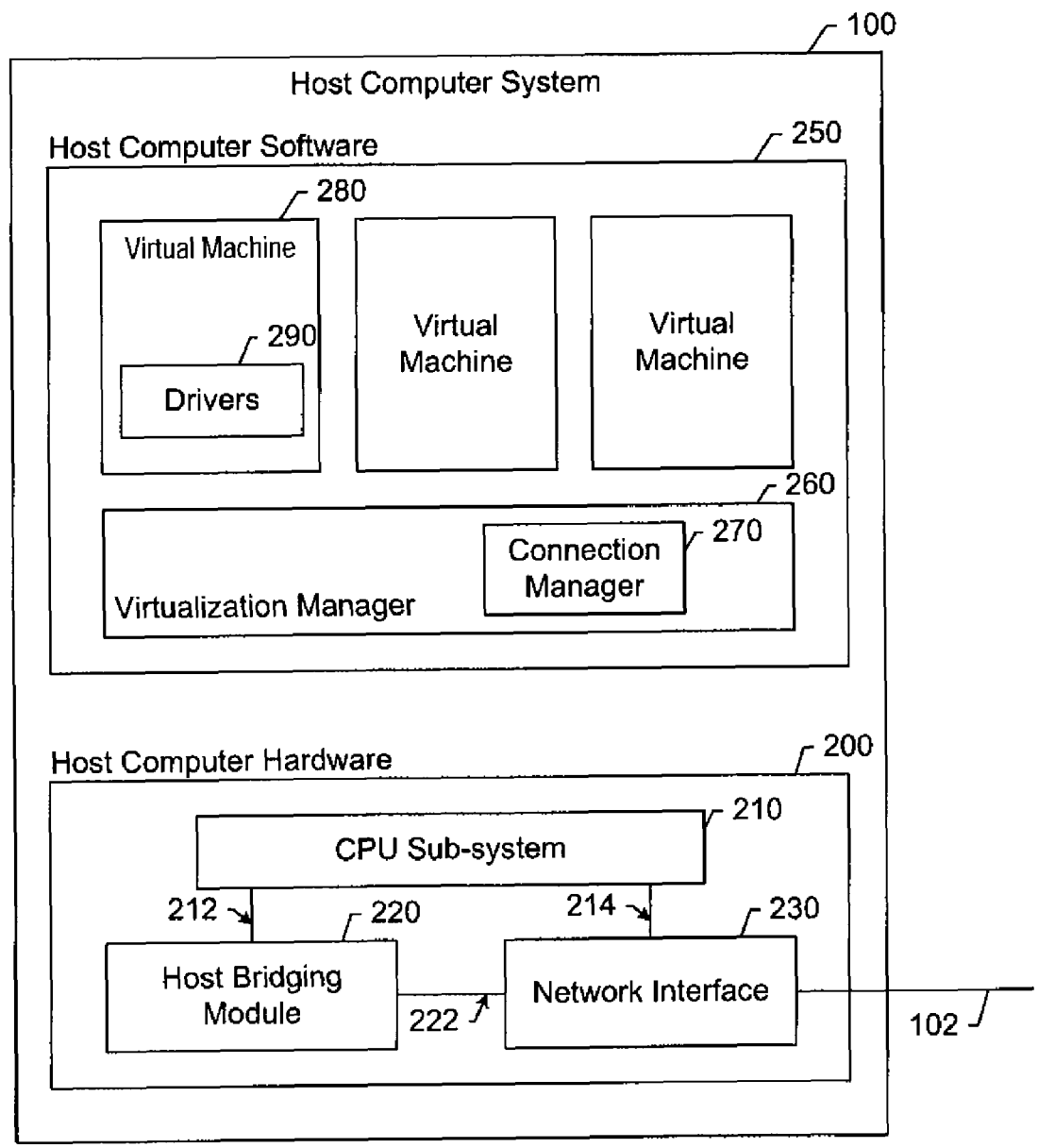
FIG. 2 is a diagram of a host system including host computer software and host computer hardware.

FIG. 2 shows an embodiment of host computer system 100 introduced in FIG. 1. The embodiment of system 100 shown is comprised of host computer hardware 200 and host computer software 250. Note that FIG. 2 describes structures of host computer system 100 specifically relevant to enabling bridged devices interfaces. Other standard components including power supply, storage sub-system, local device interfaces and associated software, status indicators and enclosure are assumed present but not explicitly described.

Hardware 200 includes CPU sub-system 210 connected by system interconnect 212 to host bridging module 220. In the described embodiment, interconnect 212 is a PCI-Express connection but alternative embodiments use alternative interconnects such as Peripheral Component Interconnect (PCI), HyperTransport™, Infiniband® or other data interconnects. In an alternative embodiment interconnect 212 is a composite interconnect comprising an aggregation of different physical connections. One example of such a composite interconnect is a DVI connection used for display information combined with a PCI-Express connection used for other data. Another example is a set of multiple physical PCI-Express connections.

Host bridging module 220 provides processing functions that enable multiple remote device interfaces to be individually presented to a prescribed Virtual Machine (VM) as a set of interface functions. As referred to herein, an 'interface function' is defined as a set of registers and signals associated with a host bridging controller and made available to bus drivers in a VM domain. One example of an interface function is a 'PCI function' as defined by PCI specifications known to those skilled in the art. In a PCI-Express embodiment, a PCI function is indicated by a PCI-Express function number with associated configuration space. Each interface function is presented to the prescribed VM in a substantially similar manner to which an equivalent local device interface function would be presented to the VM using a locally implemented controller. In one embodiment, a USB device interface is presented to a VM as a USB interface function substantially similar to a USB device interface presented by a locally implemented USB host controller, for example as specified by USB Open Host Controller Interface (OHCI) specifications.

Other embodiments of interface functions include video functions, virtual displays in multiplexed video interfaces, and video image transfer PCI functions.

Module 220 then manages the transfer of data related to each bridging controller between the VM and the remote computer associated with the VM. Module 220 is also capable of simultaneously supporting sets of interface functions associated with multiple remote computers. An embodiment of host bridging module 220 is described herein and illustrated in FIG. 5.

Hardware 200 also provides network interface 230 for connection 102. Interface 230 supports protocol termination functions such as TCP/IP processing and a physical-layer interface for connection 102. In one embodiment, module 220 is tightly coupled with interface 230 and communications between module 220 and interface 230 occurs over interconnect 222 where interconnect 222 is a data bus in the embodiment shown. In another embodiment, interface 230 is a separate resource shared between CPU sub-system 210 and module 220. In such an embodiment, CPU sub-system 210 may be connected to interface 230 by interconnect 214, wherein interconnect 214 is a standard I/O connection such as a PCI-Express connection. In an embodiment with a shared network interface, module 220 communicates indirectly with interface 230 via CPU sub-system 210. In an embodiment module 220 uses both interconnects 212 and 222 for different types of communications.

Software 250 is a virtualized software environment comprising virtualization manager 260 and multiple VMs, including VM 280 and others shown. Virtualization manager 260 (alternatively referred to as a Hypervisor™ or a virtual machine monitor) manages the operation of VM 280 and other VMs shown. Connection manager 270 is incorporated into virtualization manager 260 to facilitate device bridging using methods described herein. Note that virtualization manager 260 also comprises other software components typical of a standard virtualization manager but not shown in FIG. 2.

VM 280 (alternatively referred to as a "hardware virtual machine" or "operating system domain") is comprised of an operating system such as a standard Windows- or Linux™-based operating system and other software such as standard application software used by a remote desktop user. VM 280 includes drivers 290 which are substantially similar to the set of drivers required in a desktop computing environment. Drivers 290 are described in FIG. 3.

Figure 3:
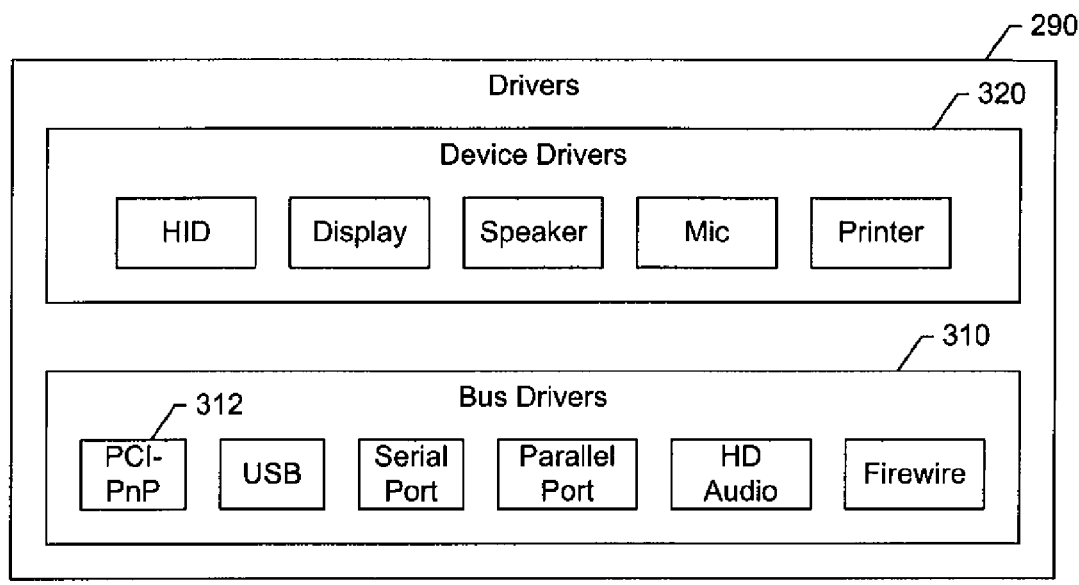
FIG. 3 is a diagram of a set of drivers associated with a virtual machine.

FIG. 3 shows an embodiment of drivers 290 in FIG. 2 to facilitate later descriptions related to interface functions. Drivers 290 comprise standard drivers associated with a standard operating system environment necessary to enable a locally available set of peripheral devices such as mouse and keyboard human interface devices (HIDs), printers, audio devices, USB devices, Firewire devices or other local peripherals. Rather than requiring the availability of specialized drivers with "remoting" capabilities or requiring the installation of drivers at a remote computer, the present invention provides apparatus and methods that enable the normal operation of native drivers within contained VM environments even though the device interfaces are remotely located.

Referring to FIG. 3, drivers 290 are comprised of lower level bus drivers 310 and higher level device drivers 320. Low-level drivers support local bus controllers such as PCI, USB, Firewire or other local bus controllers. For example PCI plug and play (PCI-PnP) driver 312 enables PCI plug and play operation. Note that other standard low-level drivers such as PCI power management (PCI-PM) driver and others are assumed present but not shown.

Higher level device drivers 320 operate as an interface between the application software and physical resources available to the application such as HID devices, display, printer, speaker, microphone or other resources. Other embodiments of drivers are contemplated. For example, Linux uses a different driver stack and terminology to those of a Windows operating system, however, most operating domains, including Windows, Linux and others incorporate drivers functionally equivalent to those shown in FIG. 3.

Figure 4:
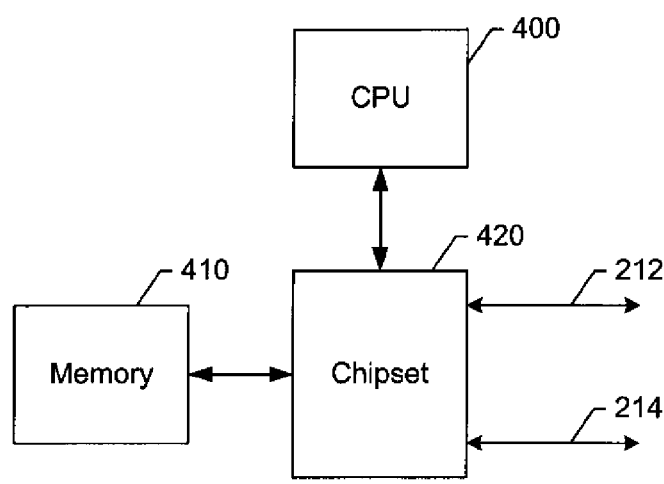
FIG. 4 is a diagram of a CPU sub-system used to host virtualization software and virtual machines.

FIG. 4 shows an embodiment of CPU sub-system 210 in FIG. 2. Sub-system 210 is comprised of CPU 400 connected to memory 410 by chipset 420. Examples of CPU 400 include 32-bit, 64-bit or other CPUs such as an AMD Opteron or Intel Xeon processor. In an embodiment, CPU 400 is a multi-core processor. In another embodiment, CPU 400 incorporates hardware-based virtualization management features (e.g. emulated multiple register sets). However, availability of these features is not essential to the operation of the described system.

Chipset 420 includes interface support for memory 410, such as provided by a typical north bridge. Chipset 420 also provides PCI-Express connections for interconnects 212 and 214 in FIG. 2. As described herein, other embodiments of the present invention use different interconnect methods. In an embodiment, chipset 420 also incorporates memory and I/O virtualization features such as an I/O memory management unit (IOMMU) or PCI I/O virtualization (IOV) functions.

One alternative embodiment of CPU sub-system 210 (ref. FIG. 2) has multiple CPUs. In the embodiment, memory 410 or interconnects 212 and 214 may not be associated with their closest CPU. For example, in an embodiment using a Hyper-Transport architecture, memory 410 is accessible from a (non-closest) neighboring CPU using a series of switched connections. Likewise, interconnect 212 or interconnect 214 may also be accessed from a non-closest neighboring CPU. CPU sub-system 210 may also include other features and functions typical of a south bridge configuration but not essential to the present invention. These include I/O hub, local peripheral interface controller functions and graphic processing functions.

Figure 5:
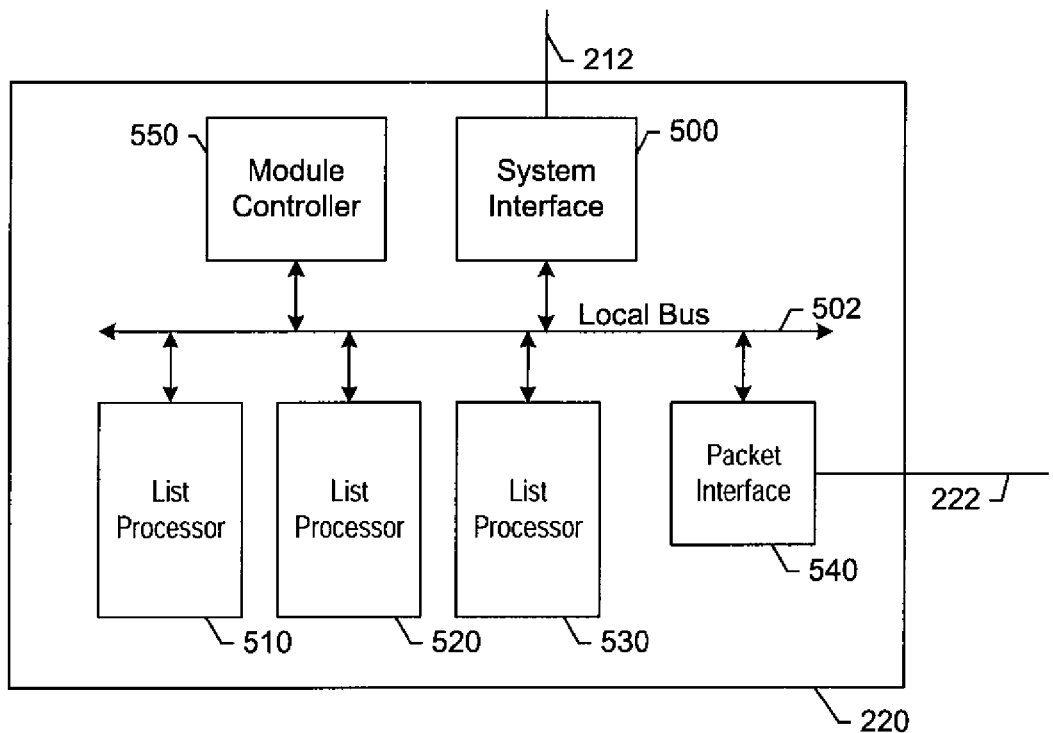
FIG. 5 is a diagram of a host bridging module used to present interface functions to host software.

FIG. 5 shows an embodiment of host bridging module 220 introduced in FIG. 2. Module 220 incorporates system interface 500 which provides inter-working functions between elements on internal local bus 502 and interconnect 212. In a PCI-Express embodiment, interface 500 incorporates north-facing PCI-Express termination circuitry and south-facing circuitry for the termination of local bus 502 (such as an advanced microprocessor bus architecture AMBA bus). In an alternative embodiment supporting a composite interconnect, interface 500 provides termination for different individual connections (e.g. multiple PCI-Express interfaces or a PCI-Express interface aggregated with a DVI interface). In such an embodiment, local bus 502 may be comprised of multiple data buses to accommodate the increased required data throughput.

In an embodiment, interface 500 presents north facing, independent interface functions for each device interface to each VM. As an example, each interface function is a PCI function as indicated by a PCI-Express function number.

List processors 510, 520 and 530 provide Direct Memory Access (DMA) controllers and other processing resources that enable bridging of data connections between interconnect 222 and CPU sub-system 210 in FIG. 2. In one embodiment, a different list processor is assigned to each type of device interface. For example, in an embodiment in which interface 121 (in FIG. 1) is a VGA display interface and interface 123 (in FIG. 1) is a USB interface and interface 125 is a high definition audio (HD Audio) interface, a different list processor is assigned to each of the three interface types. For example, in an embodiment list processor 510 is assigned to VGA interfaces, list processor 520 is assigned to USB interfaces and list processor 530 is assigned to HD Audio interfaces. In a typical embodiment, each list processor is further enabled to support the same device interface type (and associated interface function) from multiple remote computers.

Many alternative embodiments of the present invention may be implemented. For example, some embodiments use a different number of list processors to service a different number of device interface types. One alternative embodiment uses multiple list processors to service each device interface type in order to increase the number of remote computer connections. In another alternative, each list processor is enabled to service multiple different device interface types by incorporating a set of interface functions associated with a corresponding set of device interface types. In yet another embodiment, each list processor is configured at run-time to support an interface function type prescribed by connection manager 270 in FIG. 2. An embodiment of list processor 510 is described herein and illustrated in FIG. 6.

Packet interface 540 is an optional module that provides a common bus interface between list processors and connection 222. In an alternative embodiment, list processors 510, 520 and 530 each have separate packet interfaces to network interface 230 in FIG. 2. In another alternative embodiment, packet interface 540 incorporates DMA controllers for the transfer of data between list processors and connection 222. In an alternative embodiment in which interconnect 212 is used to transport packet data to network interface 230, packet interface 540 is not required.

Module controller 550 manages module 220 including initialization of local bus 502, system interface 500, packet interface 540 and list processors shown. Module controller 550 executes bridge management functions under control of connection manager 270 in FIG. 2. These functions include establishment of management connections with the remote computers described herein and illustrated in FIG. 1, allocation of bridging resources by assigning each bridged connection (comprising a bridged device interface and an associated interface function) to an appropriate list processor and initialization of each bridged connection by configuring the list processor to communicate with the correct VM as prescribed by connection manager 270. In one embodiment, list processors 510 and others shown incorporate programmable address translation tables that enable a remote device interface to be associated with any prescribed VM. In another embodiment, system interface 500 performs address translation. In yet another embodiment CPU sub-system 210 performs address translation, for example using standard PCI IOV virtualization methods. Note that while the embodiment of host bridging module described herein and illustrated in FIG. 5 is comprised of hardware circuits as might be implemented as a System on Chip (SoC) or integrated in a south bridge, alternative embodiments, such as the software embodiment described herein and illustrated in FIG. 11 also are suitable alternative embodiments of the present invention.

Figure 6:
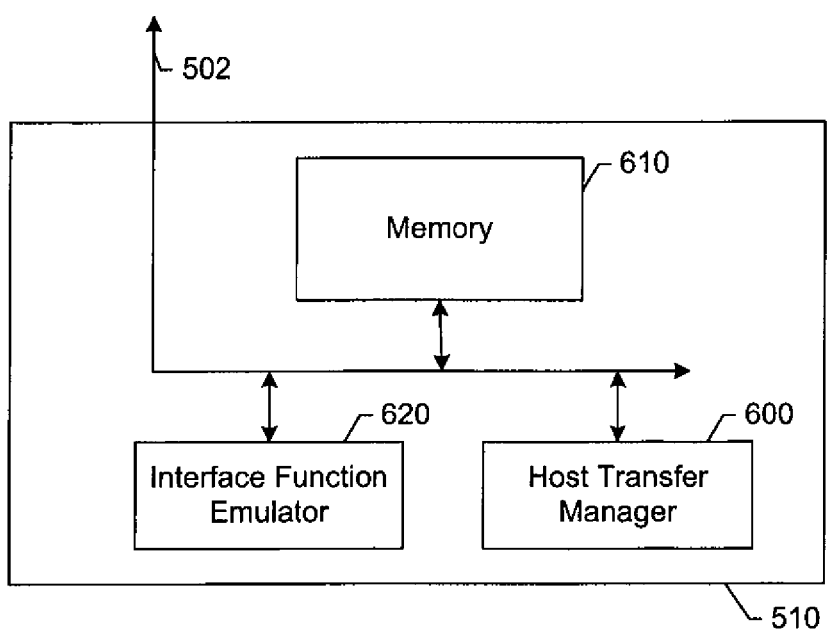
FIG. 6 is a diagram of a list processor used to translate data between packet structures suitable for network communications and driver-compatible structures.

FIG. 6 shows an embodiment of list processor 510 in FIG. 5. List processor 510 translates data associated with remote device interfaces between packet structures suitable for network communications and driver-compatible structures presented as interface functions previously defined. Data translation functions comprise data format conversion between frames and packets, address translation, timing management functions, interrupt functions and error handling.

Referring to FIG. 6, host transfer manager 600 is comprised of DMA controllers for the transfer of data to or from packet interface 540 in FIG. 5, address translation tables, timing logic to enable synchronized communications with remote peripheral interfaces, control protocol functions and error handling logic. In an embodiment, a DMA controller in transfer manager 600 traverses multiple DMA descriptor lists associated with device interfaces from multiple remote computers. In another embodiment, multiple DMA controllers are implemented, each assigned to a different device interfaces. Remote-bound register updates are transmitted as control packets while inbound control packets received from a remote computer are forwarded to interface function emulator 620 as control messages, flags, register updates or interrupts.

An embodiment of transfer manager 600 includes codec functions for the compression and de-compression of data. As one example of compression, an audio codec function performs audio compression of peripheral-bound data. As another example of compression, a video codec function performs lossy compression of display data. As another example of a codec function, an audio codec provides silence suppression functions that reduce the bandwidth consumed by inbound and outbound audio data.

Transfer manager 600 may implement other functions to support the timing of transfers. For example, in an audio embodiment, transfer manager 600 implements cadence generators to provide audio timing signals such as 48 KHz or 44.1

KHz timing signals for timed framing of audio samples. In an embodiment, transfer manager determines the appropriate compression type based on data type. As one example, transfer manager 600 identifies audio and image data based on different data types. Audio data is then subjected to audio compression methods and image data subjected to image compression methods. In an embodiment, image data is subjected to lossless compression. In another embodiment, image data is subjected to lossy compression.

Memory 610 stores DMA descriptor lists, address translation tables used by host transfer manager 600 and buffers for framed or packet data. The embodiment in FIG. 6 shows a memory resource for each list processor. In an alternative embodiment, global memory resources are attached to local bus 502 in FIG. 5 and shared by list processors 510, 520 and 530. In an audio embodiment supporting inbound audio, memory 610 implements packet buffers such as latency or jitter buffers for inbound audio data. In a USB embodiment, memory 610 comprises data buffers for transmitting and receiving USB data packets, descriptor list update packets and shadow descriptor lists described later. In one embodiment, different data types such as bulk, control, interrupt or isochronous types are queued in different data buffers for transfer at different data rates. In another embodiment, data transfer management functions such as priority management is implemented in packet interface 540 in FIG. 5.

Interface function emulator 620 presents each remote device interface assigned to list processor 510 (ref. FIG. 5) as an interface function as defined. In one embodiment of FIG. 6, registers are located within emulator 620. In another embodiment, some or all registers are located in memory 610. As an example of an audio embodiment of emulator 620, emulator 620 implements an HD-Audio compatible registers and presents an HD Audio interface function as a PCI-based audio controller, alternatively termed an 'audio controller peripheral component interconnect function' to HD Audio drivers within the prescribed VM. Emulator 620 operates in conjunction with audio stream buffers such as HD-Audio compatible command output ring buffer (CORB), response input ring buffer (RIRB) and audio data buffers in the VM domain. Methods used by an HD Audio embodiment are described in additional detail herein. As an example of a USB embodiment of emulator 620, a USB OHCI, including operational registers (OPR) is presented as a PCI-based OHCI USB controller, alternatively termed a 'universal serial bus controller peripheral component interconnect function' to an OHCI bus driver within a VM as an OHCI interface function. Emulator 620 and transfer manager 600 operate on shadow descriptor lists stored in memory 610. Methods used by a USB embodiment are described in additional detail herein. As an example of a display embodiment of emulator 620, a VGA interface including VGA buffers and virtual paged VGA register sets is presented as a PCI-based VGA controller to a VGA driver within the prescribed VM. Methods used by a VGA embodiment are described in additional detail herein.

Figure 7:
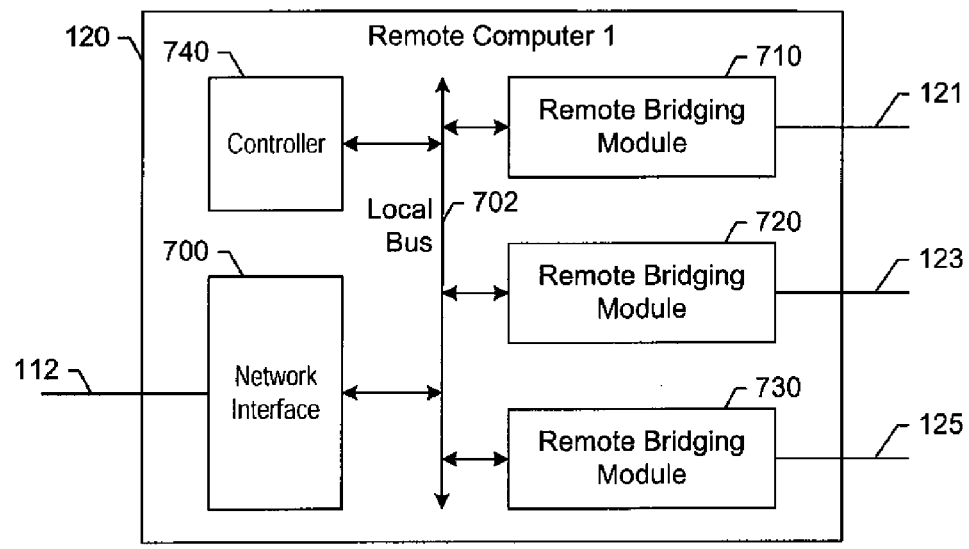
FIG. 7 is a diagram of a remote computer used to provide user interface functions.

FIG. 7 shows an embodiment of remote computer 120 in FIG. 1. The described embodiment enables the connection of a set of peripheral devices without requiring the use of local bus drivers or device drivers. Note that FIG. 7 illustrates structures of remote computer 120 specifically relevant to bridged peripheral devices interfaces. Other components including power supply, status indicators and enclosure are assumed present.

Remote computer 120 is comprised of network interface 700 that terminates connection 112 and provides a network interface for remote bridging modules 710, 720 and 730 shown via local bus 702. In one embodiment, local bus 702 is a standard interconnect such as an AMBA bus suitable for an SoC implementation. In alternative embodiments, other suitable busses are used.

Controller 740 manages computer 120 including initialization of local bus 702, interface 700 and bridging modules shown. Controller 740 executes bridge management functions including establishment of a management connection with host computer system 100 (ref. FIG. 1) and presentation of device interface compatibility requirements to connection manager 270 in FIG. 2. In one embodiment, controller 740 also provides the functionality to terminate some peripheral device connections. In an embodiment, local peripheral device connections are terminated for a limited period of time until a management connection has been established and a set of device interfaces has been authorized to use connection 112. This prevents the connection of unauthorized peripheral devices to a network. In an alternative embodiment, selective peripheral device connections are continuously terminated.

Remote bridging modules 710, 720 and 730 provide interfaces 121, 123 and 125 respectively. They operate in conjunction with host bridging module 220 in FIG. 2 to provide bridged connections for the authorized set of device interfaces. Dependent on the interface type, these modules may be differentiated as described in FIG. 8. Note that two or more modules may be substantially similar in order to support the same type of device interface (for example in the case where multiple display interfaces are supported). Module 710, representative of modules 720 and 730 is described herein and illustrated in FIG. 8.

Other embodiments of remote computer 120 are contemplated. In one alternative embodiment, remote computer 120 is a standard computer such as a desktop or laptop computer modified to support bridged device interfaces. In such an alternative embodiment, network interface 700 is a standard PC network interface, controller 740 is a standard PC processor such as an Intel Pentium processor and local bus 702 is a standard I/O expansion bus such as a PCI bus. Remote bridging modules 710, 720 and 730 may then be integrated on one more PC expansion cards or modules. Alternative embodiments use different suitable desktop or thin client processors such as those manufactured by Intel, Sun Microsystems, Motorola, AMD or VIA Technologies Inc.

Figure 8:
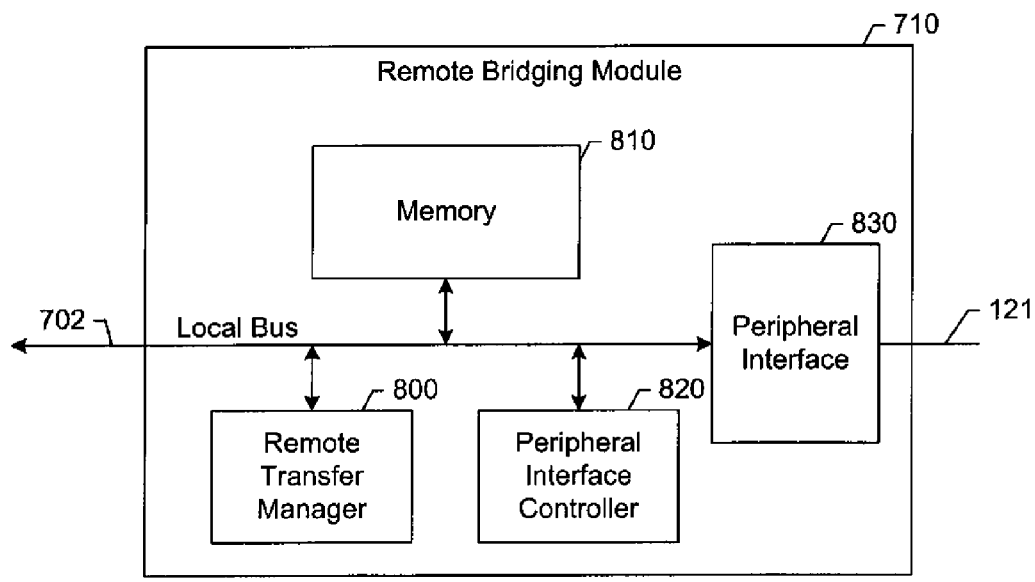
FIG. 8 is a diagram of a remote bridging module used to bridge a device interface.

FIG. 8 shows an embodiment of remote bridging module 710 in FIG. 7 used to bridge a device interface. Bridging module 710 includes remote transfer manager 800, memory 810, peripheral interface controller 820 and peripheral interface 830, all described below. In an embodiment in which device interface 121 comprises multiple aggregated peripheral bus interfaces (e.g. DVI and DDC), peripheral interface 830 supports multiple bus interfaces and multiple peripheral interface controllers (ref. controller 820) are provided. As described herein and illustrated in FIG. 1, in some embodiments, peripheral interface 121 is comprised of multiple physical connections. In a USB embodiment, peripheral interface 830 may include a USB hub to support multiple USB ports. In a PCI Express embodiment, peripheral interface 830 may support a PCI switch.

Remote transfer manager 800 comprises DMA controllers for the transfer of data to or from network interface 700 in FIG. 7, timing logic to enable synchronized communications with host bridging module 220 in FIG. 2 and error handling logic. In an alternative embodiment, remote transfer manager 800 incorporates codec functions complementary to associated codec functions in host bridging module 220 in FIG. 2.

Memory 810 stores DMA descriptor lists and temporary buffers for packet and framed data structures. The embodiment in FIG. 8 shows a separate memory resource associated with each remote bridging module. Alternative embodiments such as a shared global memory resource or a hybrid architecture may also be used. In an output audio embodiment of bridging module 710, memory 810 comprises and one or more packet audio buffers for peripheral-bound audio data and optionally frame buffers for audio frames used by audio peripheral interface controller 820. (In an alternative embodiment, peripheral interface controller 820 incorporates its own audio frame buffers). In an input audio embodiment, memory 810 comprises one or more packet assembly buffers for audio packets bound for host system 100. In a USB embodiment, memory 810 comprises standard data structures compatible with a USB peripheral interface controller, including a host controller communications area (HCCA), ED and TD descriptor lists and a done queue. In a display embodiment, memory 810 comprises one or more frame buffers and associated frame buffer sequence pointers.

Peripheral interface controller 820 is a standard bus controller compatible with the device interface. As an example of a USB embodiment, controller 820 is a standard OHCI/EHCI USB controller. As an example of an audio embodiment, controller 820 is a standard HD Audio controller. Examples of video bus controllers include VGA or DVI controllers.

Peripheral interface 830 terminates device interface 121, including providing a physical interface, bus transceiver logic and transport layer protocol termination for one or more buses. One example of interface 830 is a USB interface. Another example is an HD Audio bus interface. Examples of display interfaces include VGA, DVI or DisplayPort interfaces.

In an embodiment used to transfer outbound data to device interface 121, remote transfer manager 800 receives data packets over local bus 702, converts them to native data structures compatible with peripheral interface controller 820 and stores them in memory 810. Register updates initiated by drivers 290 (in FIG. 2) are received as control packets and written to peripheral interface controller 820. In an embodiment used to transfer inbound data from device interface 121 to host system 100 (FIG. 1), peripheral interface controller 820 reads data frames from peripheral interface 830 and stores the data in memory 810. Remote transfer manager 800 converts the frames to packet data structures suitable for network transmission and forwards the packets over local bus 702 to network interface 700. Interrupts received on device interface 121, interrupts generated by controller 820 and status messages are communicated as control packets to host transfer manager 600 in FIG. 6.

Figure 9:
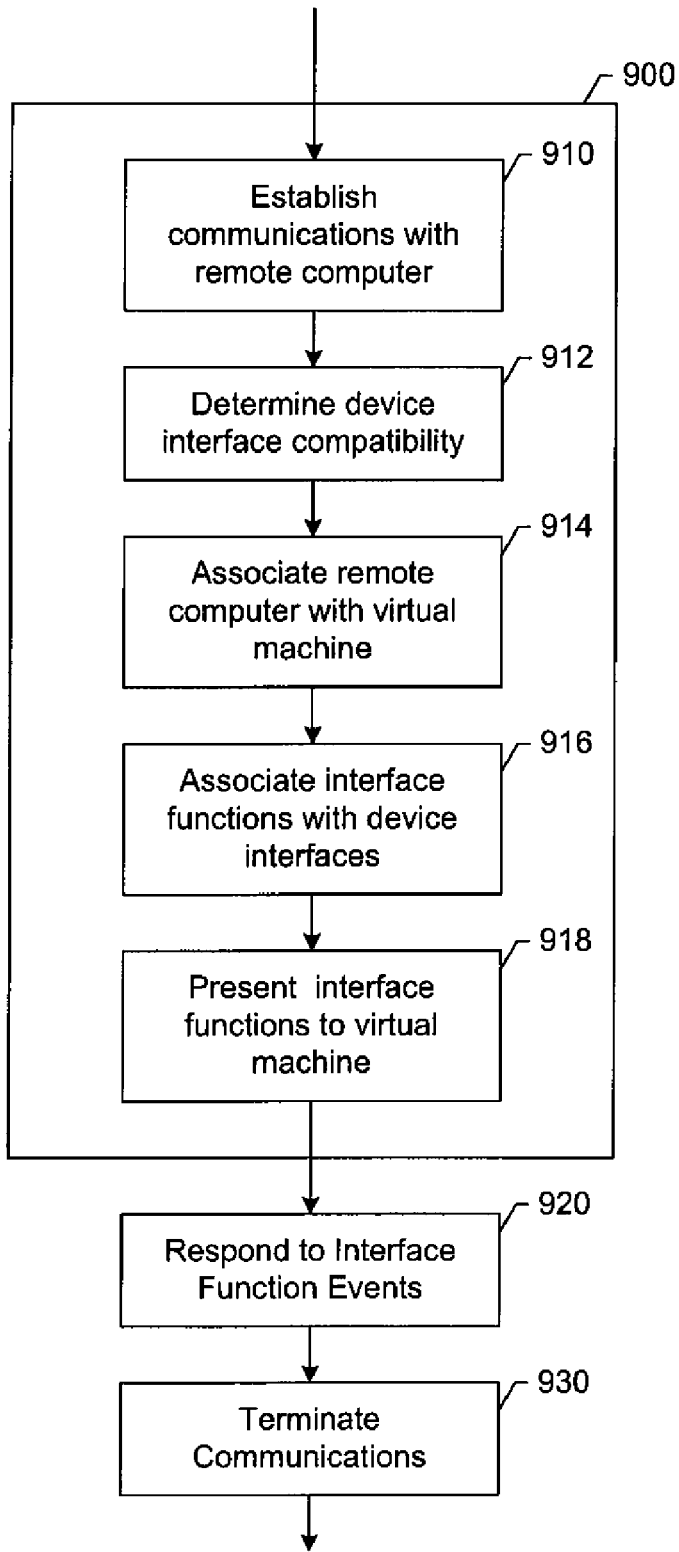
FIG. 9 shows a method for communications between a host computer system and a remote computer.

FIG. 9 shows a method for establishing and maintaining communications between a VM such as VM 280 in FIG. 2 and at least one device interface such as device interface 121 associated with remote computer 120 in FIG. 1. The method shown is comprised of step 900 in which a set of device interfaces of a remote computer are associated with a VM, followed by step 920 in which the communication connection responds to interface function events.

Step 900 is comprised of several incremental steps. As a first incremental step 910, communications with a remote computer (such as computer 120 in FIG. 1) in operative control of remote driver interfaces is established when the remote computer is connected to a network (ref. network 110 in FIG. 1). Information about the remote computer may be received at this time. Communication may be accomplished in a variety of ways. In one embodiment, a Domain Name Server (DNS) server assigns the target remote computer with an IP address. The target computer then requests authentication by a standard connection broker elsewhere on the network. Once authentication has been established, the connection broker forwards identification information of the authenticated remote computer to connection manager 270 in FIG. 2. Connection manager 270 then uses module controller 550 in FIG. 5 to initiate the establishment of a management connection with the target remote computer, for example with controller 740 in FIG. 7. Other methods for establishing a connection with a remote computer known to the art may also be used.

As a next incremental step 912, a list of device interface compatibility requirements associated with the remote computer is determined by connection manager 270 in FIG. 2 using the connection established in step 910. Compatibility information includes the type of device interfaces present at the remote computer (for example computer 120 in FIG. 1) and the number of device interfaces of each type. Compatibility information also includes the types of device interfaces supported by the host bridging module (for example module 220 in FIG. 2). In one embodiment, the state of one or more device interfaces is also determined.

As a next incremental step 914, the remote computer is associated with a VM in a one-to-one association. Connection manager 270 in FIG. 2 selectively uses knowledge of the type of interfaces present, number of interfaces, user profile information, knowledge of VM availability and knowledge of bridging resources such as list processing and memory availability to make an appropriate association. In a trivial embodiment in which all remote computers have a substantially similar set of device interfaces and host resources are undersubscribed, the next VM on an availability list is associated with the remote computer. In an embodiment where different remote computers have different device interface types and different VMs have different driver capabilities, connection manager 270 selects a compatible VM based on capabilities match between drivers and device interfaces. In another embodiment, connection manager 270 associates a VM based on a list that maps user profiles to different VMs. In another embodiment, only a partial set of device interfaces is associated based on user profile information, bridging resource availability or other restriction criteria. In such an embodiment, connection manager 270 may report the association list back to the target remote computer so that the user may be notified by controller 740 (in FIG. 7) of a reduced operational capability. This may be achieved using out of band management communications, for example using a connection broker. In a more sophisticated embodiment supporting oversubscription, bridging resources may be transferred from lower priority users to higher priority users in some situations. For example, a low priority USB connection may be terminated and list processing resources re-assigned to a higher priority USB connection. In such an embodiment, connection manager 270 may report advance notice of the termination to the lower priority remote computer so that the device interface may be gracefully shut down and the user notified. In another embodiment, VM association comprises using the connection manager to boot a new VM. In an embodiment, the VM is selected from a set of predefine VM images stored on disk. Each VM contains different content to match different user and client profiles.

As a next incremental step 916, at least one device interface is associated with a compatible interface function on host computer system 100. In an embodiment, connection manager 270 assigns host bridging module resources, including memory resources, transfer management resources and interface function emulation resources of one or more list processors such as list processor 510 described in FIG. 6. Memory and registers are initialized and address translation tables that provide an association between the device interface address domain and virtualized VM address domain are configured.

As a next incremental step 918, the interface functions of step 916 are presented to a VM in forms recognizable to the VM as forms in which interface functions are presented by controllers local to a host computer system that control device interfaces local to the host computer system. In an embodiment, each interface function is presented using a PCI PnP event initiated by connection manager 270 in FIG. 2. In such an embodiment, connection manager requests host bridging module 220 in FIG. 2 to initiate a PnP event. Module controller 550 (in FIG. 5) then configures the associated interface function emulator to trigger the PnP event. In the embodiment shown in FIG. 5, the interface function emulator uses system interface 500 to generate a PCI-Express PnP event that is directed by PCI virtualization resources in virtualization manager 250 in FIG. 2 to notify the PnP driver of the associated VM, such as PCI-PnP driver 312 in FIG. 3.

As a next step 920, in response to interface function events, one or more commands, or data, related to the presented interface and usable by the device interfaces, is sent to the remote computer. For example, commands are executed by a bus driver during configuration to enumerate and initialize a peripheral interface controller (for example controller 820 in FIG. 8). As described, the driver operates in the same way as if the peripheral controller was located in the host system. Another example is a command executed in response to a connection event from the remote device interface indicating a device has been connected at the remote computer. This type of event may result in a series of subsequent device initialization events and commands. Other events include communication of data and device events between the device and an application running on the associated VM. Another example of a command is a command that allocates list processing resources. Another example of resource allocation is the allocation of VM specific bridged controller resources. Another example of resource allocation is memory allocation. Memory may require adjustment as the number of devices attached to the device interface changes.

The sent commands and/or data can also be managed with respect to transmission requirements based on available bandwidth and compression algorithms available to the system. In an embodiment of managed data, the application of compression algorithm is based on data type and available bandwidth. In such an embodiment, a lossy image compression algorithm is applied to image data during periods of low bandwidth availability but a lossless image compression algorithm is applied during periods when bandwidth availability is sufficient to enable lossless communications.

As a next step 930, communications is terminated at the completion of the session. As one example, a connection broker sends a termination event to connection manager 270 when a user logs off from a remote computer. When connection manager 270 receives a termination event, it frees resources including VM resources, list processing resources and memory resources in host bridging module 220 associated with the terminated bridged connections for future use by other communication sessions.

Figure 10:
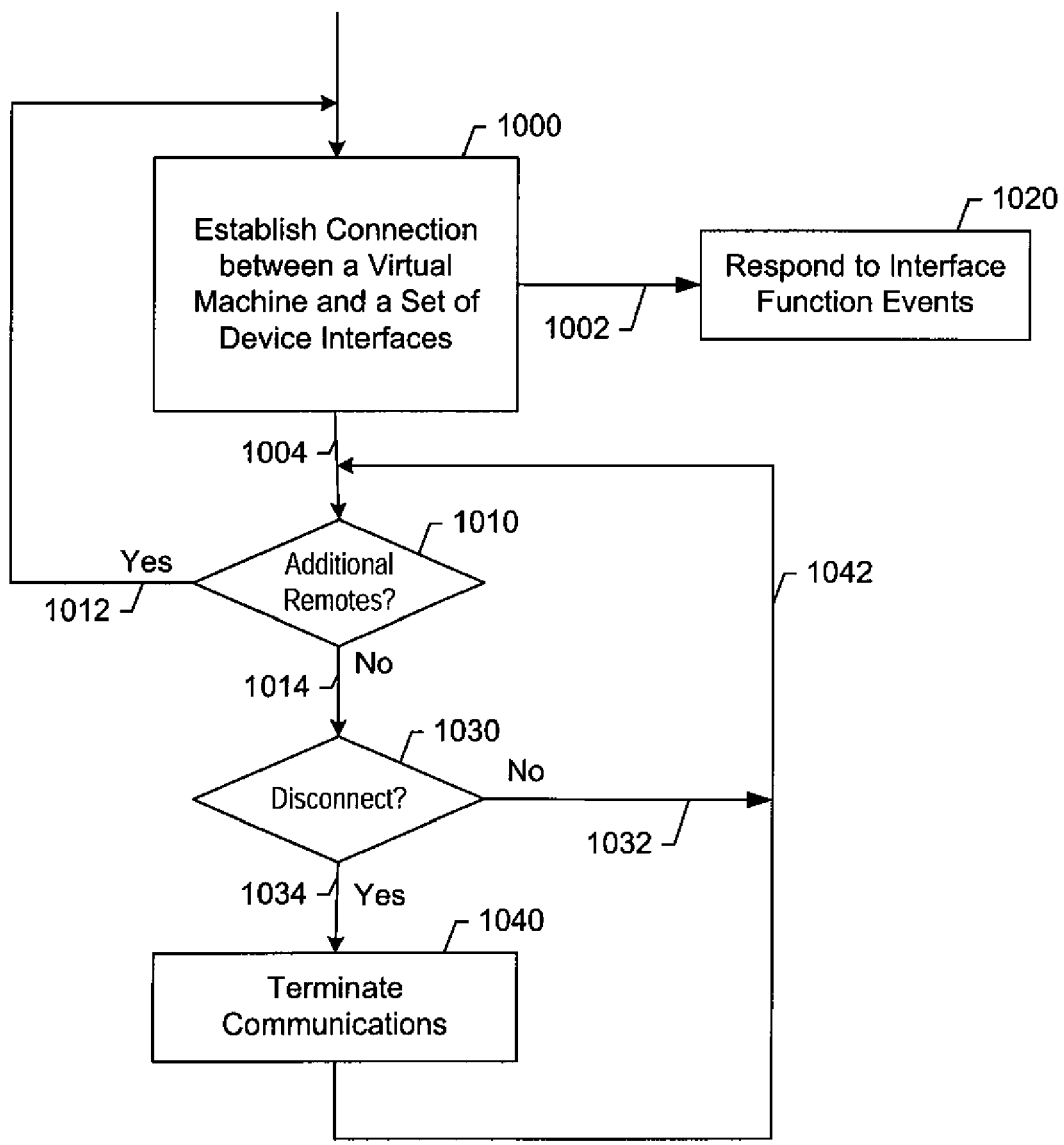
FIG. 10 shows a method for communications between a host computer system and a plurality of remote computers.

FIG. 10 shows a variation of the method described herein and illustrated in FIG. 9 in which communications with device interfaces for multiple remote computers are established. An application of the method shown in FIG. 10 is the establishment of communications between host system 100 and all the devices shown in FIG. 1. As a first step 1000, a set of remote device interfaces from one remote computer is associated with a VM. In an embodiment, step 1000 is substantially similar to step 900 in FIG. 9 and incorporates substantially similar incremental steps.

In the described embodiment, a separate processing task is spawned as case 1002 once a connection has been established. The system then starts responding to interface function events in step 1020. Step 1020 is substantially similar to step 920 described in FIG. 9.

System management tasks also continue to be executed as case 1004. As a next step 1010, the connection manager checks if an additional remote computer requires a set of interface functions. In case 1012, at least one additional remote computer requires connection so step 1000 is repeated for the additional remote computer. In case 1014, no additional remote computers require connection. The system checks for any terminated connections as a next step 1030. In case 1032, no connections are terminated so step 1010 is repeated in the described embodiment. In case 1034 at least one connection is terminated as step 1040. Step 1040 is substantially similar to step 920 described in FIG. 9. The described system then repeats step 1010 (case 1042 shown).

In an embodiment, step 1000 is repeated any time a new remote computer is connected, As an example, case 1012 may be initiated by a connection broker signaling the presence of a new remote computer. Note that the order of steps may be different in alternative embodiments of FIG. 10. In one alternative embodiment, communications with all available remote computers is established (incremental step 910 in FIG. 9) and device capabilities determined (incremental step 912 in FIG. 9) before VM associations are made (incremental step 914 in FIG. 9). This alternative approach enables connection manager 270 to prioritize VM and bridging resource allocation based on knowledge of multiple remote computer compatibility requirements.

Figure 11:
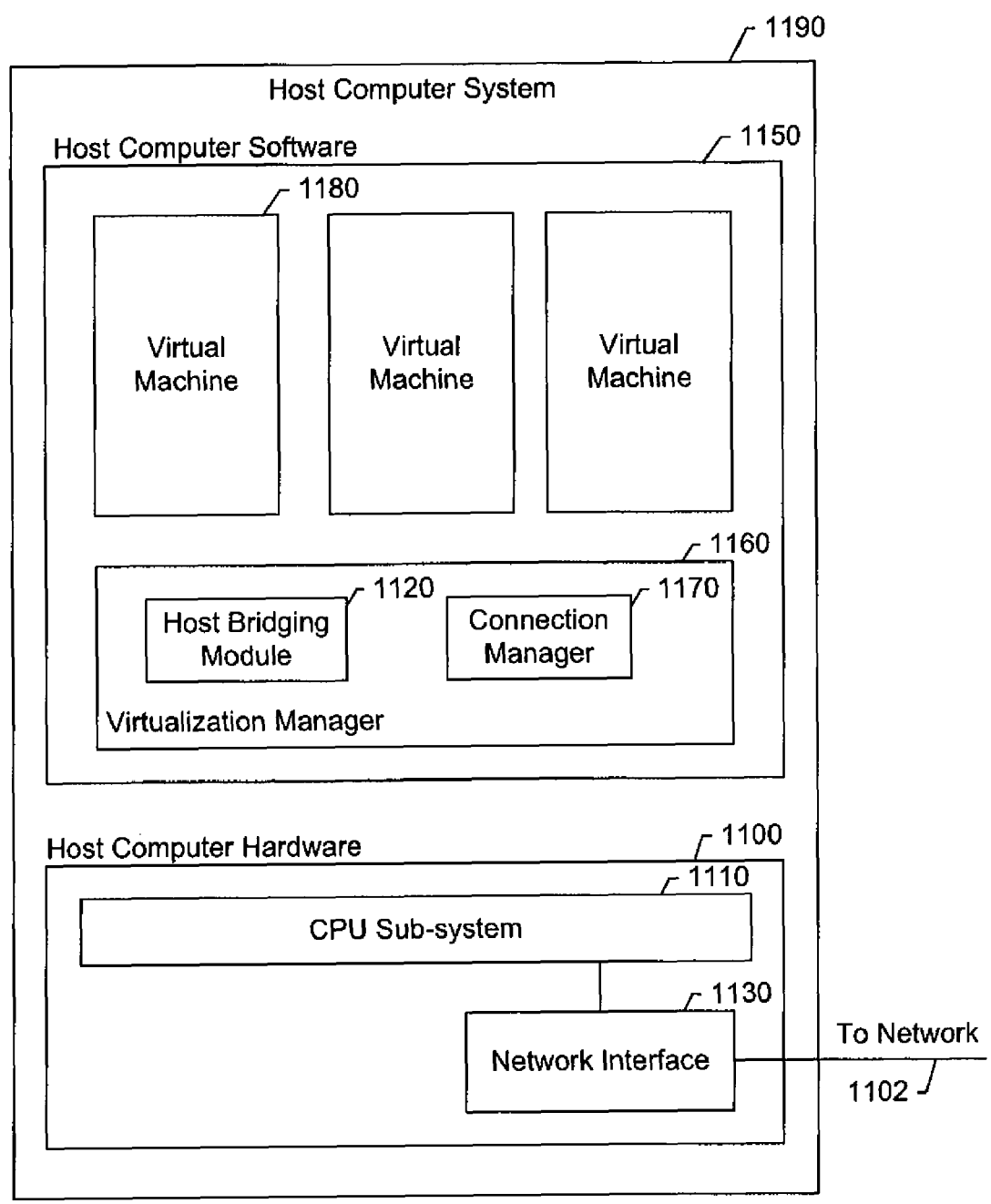
FIG. 11 shows and alternative embodiment of a host computer system that uses a software host bridging module.

FIG. 11 shows an alternative embodiment of host computer system 100 described in FIG. 2. Host computer system 1190 in FIG. 11 comprises host computer hardware 1100 and host computer software 1150. Hardware 1100 is comprised of CPU sub-system 1110 which is similar to CPU-subsystem 210 in FIG. 2 with the exception that no interconnect is used by a hardware bridging module. Network interface 1130 is connected to CPU-subsystem 1100 and provides network connection 1102, which is substantially similar to network connection 102 in FIG. 1.

Software 1150 is comprised of a set of VMs substantially similar to the VMs described in FIG. 2, including VM 1180 indicated which is substantially similar to VM 280 in FIG. 2. Software 1150 also comprises virtualization manager 1160 with connection manager 1170 substantially similar to connection manager 270 in FIG. 2 and host bridging module 1120 that is a software embodiment of host bridging module 220 described in FIG. 2. Host bridging module 1120 comprises similar resources to host bridging module 220 in FIG. 2, including list processing functions, memory, transfer manager, interface function emulation and control functions. Module 1120 differs from module 220 in that it incorporates a virtualized system interface, such as a virtualized PCI bus interface and optionally virtualized image bus interfaces rather than any physical bus interfaces. Virtualization manager 1160 then maps these virtualized bus interfaces to physical interfaces present in CPU sub-system using standard I/O interface virtualization methods.

Output Audio Embodiment

In an HD-Audio embodiment, host bridging module 220 presents one or more audio interface functions to a prescribed VM in order for audio connections to be established with remote HD Audio peripheral device interfaces. In an output audio application such as a bridged connection between a VM and a remote speaker device, host bridging module 220 assembles and communicates output audio data streams and HD-Audio audio codec commands to the remote computer.

Interface function emulator 620 (in FIG. 6) retrieves output audio data in host memory container format from the associated VM domain on interconnect 212. Transfer manager 600 then generates audio packets comprising an integer number of audio frames by converting audio samples into tightly-packed audio frame format for each stream and concatenating frames into packets. As one example, three 20-bit samples may be necessary for a 20.83 microsecond audio frame. These samples are stored in three 32-bit containers and repacked into a 64-bit segment. Transfer manager 600 initiates a cadence generator for each output audio stream using stream format registers (MULT, CHAN, and BITS) specified in the HD Audio specification to determine the number of host memory container format samples needed per stream packet as well as the stream packet sizes.

The number of host memory container samples determines how many host memory containers must be read from interconnect 212 and packed into each stream packet. Transfer manager 600 provides frame timing to flag frame boundaries so that the correct amount of data from each stream required for each frame is captured, where each stream may have a different sample rate. A sub-multiple cadence generator in transfer manager 600 (using a cadence based upon the DIV parameter of the stream format registers specified in the HD Audio specification) is also initiated for each stream that is a sub-multiple of typical 48 KHz or 44.1 KHz base sample rates.

Transfer manager 600 does not generate audio packets when emulator 620 is placed in reset (i.e. when the HD-Audio-specified CRST# flag is asserted) so all audio data pipelines are halted and flushed. In addition, stream buffers implemented in memory 610 are disabled allowing the transfer of control information and audio codec commands to be prioritized at low latency. In order to maximize the largest contiguous block of commands and ensure back-to-back command transfer on the data connection without any spurious frame gaps, a new packet is initiated in the case when an audio codec command arrives after a defined number of streams have already been placed in that packet. To ensure timely transfer of audio codec commands in cases where all streams are inactive, a frame including an audio codec command (but without audio stream data) is generated and added to the present packet in any case when a codec command is available. In cases where streams are active, codec commands are multiplexed with audio data in a ratio of one command per frame (when commands are available in the command buffer as found in a standard link frame format.)

Transfer manager 600 does not include streams that have their associated stream synchronization flag (HD-Audio-specified SSYNC) or stream reset flag (HD-Audio-specified SRST) asserted. If the HD-Audio-specified RUN flag for a particular stream is de-asserted, the cadence generator is initialized and restarts when the RUN flag is once again asserted. In addition, if RUN is de-asserted for a particular stream, audio data for that stream is not transmitted once the present frame has been processed. Bridge operational control information destined for remote transfer manager 800 in FIG. 8 is appended to the packet header.

Operational control information includes outbound packet buffer (implemented in memory 610) activation/de-activation instructions and active/inactive stream status information. Register information needed by remote transfer manager 800 in FIG. 8 is also communicated.

Transfer manager 600 monitors changes to register values that trigger frame header updates or other operational changes and updates frame headers or changes operational mode accordingly. For example, audio codec control information such as CRST# and SRST information is embedded in the frame header (as specified in the HD Audio specification).

Transfer manager 600 also manages data under-run and overflow conditions. In a case where a data under-run on peripheral interface 850 in FIG. 8 occurs, an empty FIFO interrupt (HD-Audio-specified FIFOE) is triggered and the frame multiplexing continues with no data being inserted for that stream. In one embodiment, peripheral interface controller 820 in FIG. 8 detects an under-run in the output frame queue and transmits the under-run error status in a packet via remote transfer manager 800 (in FIG. 8) to emulator 620 which in turn triggers a FIFOE error to the VM.

Completed outbound packets are then forwarded via packet interface 540 in FIG. 5 to network interface 230. In one embodiment, network interface 230 marks audio packets for priority transfer using QoS characterization. One example of QoS characterization is the setting of the TOS field in the MAC header that enables prioritization of the audio packet through switches across the network.

Input Audio Embodiment

In an embodiment where input audio streams are communicated from one or more input audio peripherals such as a microphone at a remote computer, transfer manger 600 manages packet buffers in memory 610 for input audio streams and processes inbound packets and frames at a rate defined by an inbound frame timing signal. Inbound packet processing functions include processing embedded operational control information and audio frames present in the packet payload. Timing parameters and control information are extracted from the packets and forwarded emulator 620. Audio codec responses are extracted and forwarded to a response buffer managed by emulator 620. If an audio frame is not available due to the packet buffer being empty while it is enabled, frame de-multiplexing waits for the next available frame. Once a frame is available, it is broken into its constituent pieces and the samples converted to host memory container format as defined by values in emulator 620. The separate input audio streams are then forwarded to stream buffers in memory 610.

Emulator 620 evaluates the status of the HD-Audio specified SSYNC signal for each stream. If SSYNC is negated, the stream data is converted to host memory container format and transferred to VM memory. If SSYNC is asserted, all incoming data for that stream is dropped. The update of registers such as CRST# and SRST results in control information being inserted in the headers of outgoing frames for communication to remote transfer manager 800 in FIG. 8. If the assertion of a stream reset bit (SRST) for an input audio stream is detected, all stream data is dropped until the stream reset signal has been looped back from remote transfer manager 800 in FIG. 8. If emulator 620 detects the negation of the HD-Audio specified RUN flag for a stream, all incoming data for the stream is dropped after transfer manager 600 has processed the present frame. Note that emulator 620 performs state changes only after the present frame has been processed.

As described herein, transfer manager 600 may also manage packet buffers for input audio streams. Upon startup, packet buffers are disabled and inbound packets are immediately processed. This allows initial communication comprising register updates and audio codec responses to be processed rapidly. Once a stream is activated (via codec commands), input audio stream data from the remote audio codec starts flowing from the associated remote bridging module (in FIG. 7) and a packet buffer for the stream is initialized under control of operational control information communicated from the associated remote transfer manager in the inbound packet header. Once a buffer threshold is reached, packet de-multiplexing commences and continues until an appropriate number of input audio packets have been buffered. The optimum buffer depth is based on network latency and may be a fixed or programmable value. Once a sufficient number of packets are buffered, processing of packets continues. When the associated remote bridging module detects that a remote audio codec is no longer generating input, the corresponding inbound packet buffer is de-asserted via operational control information in the packet header. If a packet buffer becomes empty (implying packet loss or a network latency condition that exceeds the buffer tolerance) the packet buffer refills before packet processing commences. In one embodiment, emulator 600 is notified of a CORB memory error to signal that audio samples may be shifted in time and the packet buffer may not be optimized for the present network latency. If reset is asserted (CRST#), packet de-multiplexing continues but de-multiplexing of inbound frames and extraction of audio codec responses is halted. Packets currently in the packet buffer are de-multiplexed into frames so that frame header information can be recovered. Audio data associated with packets is flushed and stream pipelines are re-initialized.

Audio Timing Control

In an HD-audio embodiment, transfer manager 600 uses a reference clock to provide reference timing for cadence generators and other frame timing logic. Separate frame timing circuits are used for outbound and inbound frames using outbound and inbound reference counters. Timing for the reference counters is adjustable using speedup and slowdown timing control parameters. In the case of outbound audio packets, speedup and slowdown timing control requests are issued by the associated remote transfer manager (ref FIG. 8) based on an output packet buffer fill level in remote memory 810 in FIG. 8. In the case of inbound packets, speedup and slowdown timing control requests are issued locally based on the current fill level of the input packet buffer. On request, the nominal time required to generate frame synchronization signals is then adjusted accordingly. Transfer manager 600 also provides DMA timing signals for DMA controllers in emulator. 620. By associating the DMA timing with the frame timing, responses from remote audio codecs may be returned to memory associated with the VM domain at a rate expected by the audio drivers.

In one embodiment, emulator 620 also supports an HD Audio-compatible immediate command interface capable of receiving commands directly from an audio driver associated with the VM domain rather than via a CORB command buffer. Transfer manger 600 accesses the commands for insertion in an outbound frame. In an inbound direction, transfer manger 600 receives inbound responses from the associated remote bridging module and forwards them to emulator 600 where they are presented using an HD-Audio compatible response interface.

Audio Signal Processing

In one embodiment of an HD-audio implementation, list processor 510 incorporates an audio codec for processing of audio streams. As an example of outbound signal processing, one or more output audio streams are compressed using any of several methods including adaptive differential pulse code modulation (ADPCM), code excited linear prediction (CELP), adaptive multi-rate (AMR) or other methods. When audio compression is used, the compression function is matched with an equivalent decompression function that is executed in a codec in the associated remote bridging module.

In an embodiment that supports silence suppression, a codec performs silence suppression to reduce the bandwidth of outbound streams. In another embodiment that supports compression of input audio streams, a codec decompresses audio streams compressed by the associated remote bridging module. In yet another embodiment that enables audio transmission using a best-efforts protocol such as UDP/IP, a codec executes packet loss concealment methods to recover audio data associated with lost input audio packets.

OHCI USB

In an embodiment where one or more USB connections are to be established with USB peripherals such as USB mouse or keyboard at a remote computer, controller 740 in FIG. 7 initializes the remote USB bridging module and negotiates the supported features with the peer controller 550 (FIG. 5) during step 912 shown in FIG. 9. Then host bridging module 220 presents one or more USB interface functions to a prescribed VM and bridged USB connections are established with the remote USB device interfaces. An OHCI USB bridge between host bridging module 220 in FIG. 2 and remote bridging module 710 in FIG. 7 is established by bridging standard USB-specified communications structures such as the HCCA, descriptor lists and the operational registers (OPR). The bridge is maintained by reflecting changes initiated by either the host controller driver (HCD) of the associated VM or a USB host controller embodiment of peripheral interface controller 820 in FIG. 8 at the remote computer.

Host transfer manager 600 in FIG. 6 encapsulates outbound updates into packets for communication in addition to performing memory management, de-packetization of hostbound data and processing of inbound update packets. Control information including state information related to USB interface function emulator 620 in FIG. 6 and USB peripheral interface controller 820 in FIG. 8 is also communicated between host transfer manager 600 and remote transfer manager 800 in FIG. 8 as operational control information.

In a bridged USB embodiment, the assigned list processor tracks changes to USB endpoint descriptor (ED) and transfer descriptor (TD) lists using list a list shadowing method. As one example of a list shadowing method, interface function emulator 620 periodically scans the descriptor lists maintained by an HCD driver in the associated VM domain using substantially similar methods that a local USB host controller might traverse descriptor lists. Emulator 620 then compares the lists with a set of shadow lists comprising the most recently communicated list information (where the shadow lists are maintained in list processing memory such as memory 610).

Host transfer manager 600 then transmits information describing the differences between the original descriptor lists in the VM domain and shadow lists as a sequence of update commands in update packets. TD-related data and register information is also assembled and transmitted, optionally using multiple packets if required. Different descriptor types such as EDs or TDs and different data types such as bulk, control, interrupt or isochronous types may be sent over the network using different transfer queues at different priorities. Host transfer manager 600 also updates the shadow lists to reflect the changes.

Host transfer manager 600 also performs memory management functions by allocating and de-allocating shadow ED descriptors, shadow TD descriptors and data buffers associated with TD-related data. When a descriptor is added to a shadow list, host transfer manager 600 retrieves a free descriptor from a pool of free descriptors. When a descriptor is removed from one of the shadow lists, host transfer manager 600 deposits the removed descriptor back in the pool. In one embodiment, the pool is comprised of a list of free descriptors. Data buffers are managed in a similar way. A free data buffer list contains free data buffers that host transfer manager 600 allocates and de-allocate as necessary. Note that due to synchronization delays caused by network delays, removed descriptors and data buffers may be attached to temporary delay lists before they are put back in the free pools.

USB Interface function emulator 620 performs interrupt processing, frame counter generation and provides an early response mechanism for HCD-initiated commands that require a response earlier than can be delivered by remote peripheral interface controller 820 in FIG. 8. One example is the USB port power control register set. USB Interface function emulator 620 also provides methods for resolving potentially conflicting state changes simultaneously initiated by the HCD in the VM domain and remote USB peripheral interface controller 820 in FIG. 8. Emulator 620 receives command update packets sent by remote transfer manager 800 in FIG. 8, disassembles them into individual commands and executes them. Returned or retired TDs may have associated inbound data which remote transfer manager 800 sends in data update packets. Emulator 620 receives those packets and stores the data in the associated VM domain in the format compatible with the associated drivers. Periodic updates of the remote OPR are also received and used to update the OPR of emulator 620.

TD retirement commands sent by remote transfer manager 800 are processed by retiring the TDs from VM and shadow TD lists. Given that a descriptor list may be paused or that an ED may be disabled when data is returned from remote transfer manager 800, emulator 620 temporarily stores the data in data buffers contained in memory 610. If the associated end point or descriptor is removed, the associated data buffer is released without saving the data to VM memory. TDs for incomplete buffers are marked for delay until data buffers are completed and VM memory is accessible for update; following which the TDs are retired in strict order.

Remote transfer manager 800 in FIG. 8 receives update packets and data from host computer system 100. Transfer manager 800 applies the changes to corresponding lists stored in memory 810 in FIG. 8. Added TDs may have associated outbound data that host transfer manager 600 sends in update data packets. Remote transfer manager 800 receives the packets and stores the data in data buffers in memory 810.

Remote transfer manager 800 monitors modifications to the descriptor lists initiated by USB peripheral interface controller 820, assembles a sequence of update commands and transmits them to the host transfer manager 600. Typically, peripheral interface controller 820 (which performs substantially similar operations to a standard USB host controller) removes TDs from the head of remote TD lists or makes modifications to certain fields within the associated EDs. When a TD is removed, it is added to the head of a done queue. Once each update cycle, remote transfer manager 600 traverses the done queue and transmits the retired TDs and associated inbound data back to emulator 620 (in FIG. 6) so that the shadow TD lists in the VM memory domain can be synchronized with the equivalent remote lists and the TDs retired to the HCD. Remote transfer manger 800 also queues and transmits TD-related data packets, ED modifications, OPR contents to host transfer manger 600. Some descriptor list updates require the list to be in a defined state, for example a descriptor may need to be in a paused state before being updated. These operations may require independent acknowledgment before continuing with other operations to ensure descriptor integrity.

Remote transfer manager 800 also receives operational register updates and updates the OPR in USB peripheral interface controller 820 as appropriate. Note that the current host controller state (Operational, Suspend, Reset or Resume) as defined by the OHCI specification is set via the operational registers. It is the responsibility of the host controller drivers in the VM domain to ensure that the timing requirements for each state are respected. However, because of variable network latency, even though OPR updates are generated at the host with the correct time spacing, they may not arrive at USB peripheral interface controller 820 with the same time separation. Therefore the application of the state change may need to be delayed by remote transfer manager 800.

USB Peripheral interface 830 provides a standard USB physical interface such as a standard, high-speed or wireless USB interface.

VGA Display

In an embodiment where one or more display connections are established with display peripherals such as a VGA, DVI or Digital Packet Video Link (DPVL) monitor, host bridging module 220 presents one or more video interface functions to a prescribed VM and video connections are established with the remote display peripheral device interfaces. As one example of a video interface, host bridging module 220 presents a VGA controller interface function to a VM assigned to the remote computer and VGA drivers associated with the VM communicate with the monitor using a bridged VGA connection formed by host bridging module 220 and a remote bridging module such as module 710 in FIG. 7. The bridged connection enables the transfer of asynchronous outbound frame buffer sections from the VM domain to one or more remote frame buffers maintained in remote memory (ref. memory 810 in FIG. 8). In an alternative embodiment, frame buffers associated with host computer system 100 are not located in user-associated VM domains but rather are located in the virtualized memory of a GPU sub-system. In such an embodiment, GPU sub-system memory may be considered as an additional VM domain.

In a VGA embodiment, the VM domain may include VGA buffers and registers maintained and updated by application software and VGA drivers. During interface association (step 916 in FIG. 9) VGA Interface function emulator 620 is allocated a VGA buffer and virtual paged VGA register set. In one multi-monitor environment, interface function emulator 620 is allocated multiple VGA buffers and virtual paged VGA register sets and presents multiple virtualized VGA interfaces to the VM domain.

The assigned list processor (ref. processor 510 in FIG. 5) uses video controller register information to determine information about the display system, including size, frequency or the image and location of the frame or data buffers. In one embodiment, interface function emulator 620 simulates a video controller by taking advantage of the characteristics of a frame buffer and only communicating changes in the frame buffer data to the remote data buffers. In an alternative embodiment, host bridging module 220 also incorporates image codec functions for lossy or lossless encoding of image data on a frame by frame, section by section or block by block basis. In an alternative embodiment, host transfer manager 600 uses timing synchronization methods to minimize the latency between when blocks are transferred to remote transfer manager 800 and when the image is displayed. For example, remote transfer manager 800 may control remote buffer levels by issuing control commands to host transfer manager 600.

Remote transfer manager 800 receives inbound image data applies decoding algorithm and stores decoded images in local frame buffers. Image data may optionally be stored as compressed information and decoded prior to playout. Remote transfer manager 800 may also manage the communication of display control traffic between host computer system 100 and the display controller (ref. controller 820). As an example, display capability information may be obtained from device interface 121 and transferred to VGA interface function emulator 620.

VGA peripheral interface controller 820 performs display controller functions, including generating the timing for the VGA monitor. It reads frame buffer data from memory 810 using frame buffer sequence pointers and forwards the image to peripheral interface 830. In one VGA embodiment, the timing between when remote transfer manager 800 updates a frame buffer in memory 810 and when interface controller 820 reads the frame buffer is asynchronous. In this case, the display may be seen to "tear" if interface controller 820 reads a partially updated frame buffer. This may be avoided by timing memory access to occur only after the frame buffer is updated.

VGA peripheral interface 830 generates a display signal such as a raster signal as defined by VGA specifications. In alternative embodiments, peripheral interface 830 may generate DVI, DPVL, DisplayPort or other video signals. It also maintains monitor power state and transitions through power modes using published and interoperable methods such as providing an Energy Star compliant state machine. Peripheral interface 830 may also provide a published monitor control interface. One example is a DDC interface which includes an I2C electrical interface and DDC Command Interface protocol support.

In one alternative VGA embodiment, interface function emulator 620 maintains the interoperability functions required to work with a non-matching peripheral interface controller 820. As an example of display translation, a display controller (ref. controller 820) may use a different register set to VGA interface function emulator 620. As another example, interface function emulator 620 scales the data and modifies the monitor control values for compatibility with a different size or resolution display.

The several embodiments described herein are solely for the purpose of illustration. Persons skilled in the art will recognize from this description other embodiments may be practiced with modifications and alterations limited only by the claims.

What is claimed is:

1. A method of communicating between a plurality of virtual machines on a host computer and a plurality of remotely located devices connected to a plurality of remote computers, the method comprising:

establishing, by a connection manager, communications between a host bridging module, of the host computer, comprised of hardware circuits, and a first one of the plurality of remote computers, the first one of the plurality of remote computers comprising a Universal Serial Bus (USB) device interface and a High Definition (HD) audio interface;

associating, by the connection manager, the first one of the plurality of remote computers with a first one of the plurality of virtual machines, the plurality of virtual machines hosted on a Central Processor Unit (CPU) sub-system that is physically separate from the host bridging module;

presenting, by the host bridging module, via a physical Peripheral Component Interconnect (PCI)-Express connection, to the first one of the plurality of virtual machines, in forms recognizable by native bus drivers of an operating system of the first one of the plurality of virtual machines as forms in which hardware interface functions are presented by local interface controller hardware that controls local device interfaces, a USB bus controller interface in operative control, via the communications, with the USB device interface and an HD audio bus controller interface in operative control, via the communications, with the HD audio device interface;

executing, by the first one of the plurality of virtual machines, a command in response to an event presented by the USB bus controller interface function, the event associated with the USB device interface, the executing the command generating data;

sending, via the HD audio bus controller interface and the communications, the data to the first one of the plurality of remote computers, the data usable by the HD audio device interface; and determining that a second one of the plurality of remote computers requires a set of interface functions and repeating the establishing, the associating, the presenting, the executing, and the sending between a second one of the plurality of virtual machines and the second one of the plurality of remote computers.

2. The method of claim 1, wherein executing the command comprises a bus driver executing commands to initialize a peripheral interface controller in a remote bridging module of the first one of the plurality of remote computers.

3. The method of claim 1, wherein executing the command comprises responding to a connection event, the connection event indicating a device has been connected to the first one of the plurality of remote computers.

4. The method of claim 1, wherein executing the command further comprises communicating the data to a remote device connected to the HD audio device interface.

5. The method of claim 1, further comprising terminating the communications and freeing resources of the host bridging module.

6. The method of claim 5, wherein terminating the communications comprises a connection broker sending a termination event to the connection manager, the connection manager within a virtualization manager of the host computer, when a user logs off from the first one of the plurality of remote computer.

7. The method of claim 1, wherein presenting the first hardware interface function comprises presenting a first Peripheral Component Interconnect (PCI) interface function.

8. The method of claim 1, wherein presenting the USB bus controller interface comprises translating addresses communicated over the physical PCI-Express connection into a set of virtual addresses, the set of virtual addresses associated with the first one of the plurality of virtual machines.

9. The method of claim 1, wherein presenting the USB bus controller interface comprises presenting one of a set of PCI interface functions, the set of PCI interface functions supported by the host bridging module, comprising registers and signals, connected to a physical PCI bus.

10. The method of claim 1, further comprising the host bridging module presenting a video interface function that is in operative control, via the communications, with a video interface, to the first of the plurality of virtual machines.

11. The method of claim 1, wherein sending the data further comprises compressing a section of the data.

12. The method of claim 11, wherein sending the data comprises accessing, by a Direct Memory Access (DMA) controller of the host bridging module, memory of the CPU sub-system.

13. The method of claim 1 wherein sending the data further comprises determining, by the host bridging module, a data type of the data and applying a lossy compression algorithm based on the data type.

14. A computer readable memory, containing computer instructions which, when executed by a first processor of a host computer, manage communication between a plurality of virtual machines on a second processor of the host computer and a plurality of remotely located devices connected to a plurality of remote computers, by:
- establishing, by the first processor, communications between the host computer and one of the plurality of remote computers, the one of the plurality of remote computers comprising a Universal Serial Bus (USB) device interface and a High Definition (HD) Audio device interface;
- associating, by the first processor, the one of the plurality of remote computers with a one of the plurality of virtual machines;
- presenting, by the first processor, via a physical Peripheral Component Interconnect (PCI)-Express connection, to the one of the plurality of virtual machine, in forms recognizable by native bus drivers of an operating system of the one of the plurality of virtual machines as forms in which hardware interface functions are presented by local interface controller hardware that control local device interfaces, a USB bus controller interface in operative control, via the communications, of the first device interface type and an HD Audio bus controller interface function associated with the second device interface;
- executing, by the one of the plurality of virtual machines, a command in response to an event presented by the USB device controller interface, the event associated with the USB device interface, the executing the command generating data; and
- sending, via the HD audio bus controller interface and the communications, the data to the one of the plurality of remote computers, the data usable by the HD Audio device interface; and
- determining that a second one of the plurality of remote computers requires a set of interface functions and repeating the establishing, the associating, the presenting, the executing, and the sending between a second one of the plurality of virtual machines and the second one of the plurality of remote computers.

15. An apparatus for communicating between a plurality of virtual machines on a host computer and a plurality of remotely located device interfaces, the apparatus comprising:
- a Central Processing Unit (CPU) sub-system that hosts the plurality of virtual machines;
- a physical Peripheral Component Interconnect (PCI)-Express connection;
- a host bridging module comprised of hardware circuits that is independent of the CPU sub-system, the host bridging module physically coupled to the CPU sub-system by the physical PCI-Express connection, the host bridging module comprised of hardware circuits comprising a plurality of interface functions presented to the CPU sub-system, via the physical PCI-Express connection, as a plurality of PCI-based peripheral bus controllers, the plurality of interface functions enabled to communicate, commands and data, with the plurality of remotely located device interfaces in a one-to-one relationship, each of the plurality of interface functions individually presented, as equivalent to a local bus controller for local ones of the plurality of remotely located device interfaces, to a bus driver of ones of the plurality of virtual machines; and
- a network interface, the network interface operatively coupling, via a computer network, the host bridging module and a plurality of remote computers, the plurality of remote computers comprising the plurality of remotely located device interfaces.

16. The apparatus of claim 15, wherein each of the bus drivers of ones of the plurality of virtual machines is native to a standard operating system and enabled to operate with the host bridging module as if connected to standard local interface controller hardware connected, via local device interfaces, to local devices.

17. The apparatus of claim 15, wherein the host bridging module comprises a list processor, the list processor comprising a Direct Memory Access (DMA) controller, the DMA controller enabled to access memory coupled to the CPU processor, via the physical PCI-Express connection, in response to operations performed by each of the bus drivers.

18. The apparatus of claim 15, wherein the host bridging module comprises memory and processing resources separate from CPU sub-system, that are enabled to at least one of compress or decompress the data.

19. The apparatus of claim 18, wherein the memory and processing resources are further enabled to translate between the commands and the data and packet structures suitable for communication via the computer network.

* * * * *